United States Patent [19]

Carlson

[11] 4,213,003
[45] Jul. 15, 1980

[54] BUS CONDUIT ELECTRICAL DISTRIBUTION SYSTEM

[76] Inventor: Elmer T. Carlson, 3189 Morningside Blvd., Port St. Lucie, Fla. 33452

[21] Appl. No.: 877,595

[22] Filed: Feb. 15, 1978

Related U.S. Application Data

[63] Continuation-in-part of Ser. No. 755,446, Dec. 29, 1976, Pat. No. 4,112,249, which is a continuation-in-part of Ser. No. 554,684, Mar. 3, 1975, Pat. No. 4,008,365.

[51] Int. Cl.² .............................................. H02G 5/08
[52] U.S. Cl. ................... 174/88 B; 174/68 B
[58] Field of Search ............... 174/68 B, 70 B, 71 B, 174/72 B, 88 B, 99 B, 99 E; 339/22 B

[56] References Cited

U.S. PATENT DOCUMENTS

| 3,183,298 | 5/1965 | Weimer et al. | 174/88 B |
| 3,187,086 | 6/1965 | Moodie et al. | 174/88 B X |
| 3,459,874 | 8/1969 | Fouse et al. | 174/88 B X |
| 3,820,057 | 6/1974 | Joly | 174/88 B X |

FOREIGN PATENT DOCUMENTS

400639  1/1970  Australia .................. 174/88 B

Primary Examiner—Laramie E. Askin
Attorney, Agent, or Firm—Eugene Chovanes; Edward Lovett Jackson

[57] ABSTRACT

In a bus conduit electrical distribution system in which the conduit is normally of U cross-section with shallow U cross-sectional cover over it, the system has special joint setups in which both the conduit and the cover have double members lying one on top of the other in an overlapping manner and capable of assuming longitudinally contracted and longitudinally extended relative positions in relation to each other. The bus bars overlap at their ends and have deep slots coming in from their ends to give them a deep U shape from the longitudinal standpoint in such joint setups. In the interior of the joint setups there are disc-shaped insulating spacers with interfitting circular projections and preferably there are also additional longitudinally elongated insulating spacers. In another form of joint setup which will be used for other joints in the same system, one of the overlapping bus bars will take a hook shape. The total electrical system is compact and effective and enables assembly of the distribution system on the site in a convenient manner from components, none of which has been specially made up at the factory for use at that particular place.

2 Claims, 14 Drawing Figures

BUS CONDUIT ELECTRICAL DISTRIBUTION SYSTEM

CROSS-REFERENCE TO RELATED APPLICATIONS

This application is a continuation-in-part of my copending U.S. application Ser. No. 755,446 filed Dec. 29, 1976 for BUS TRAY ELECTRICAL DISTRIBUTION SYSTEM, now U.S. Pat. No. 4,112,249, which is hereby incorporated by reference and which was itself a continuation-in-part of my U.S. application, Ser. No. 554,684 filed Mar. 3, 1975, for BUS TRAY ELECTRICAL DISTRIBUTION SYSTEM, which is now U.S. Pat. No. 4,008,365.

BRIEF DESCRIPTION APPLICABLE TO THE INVENTION

This invention relates to BUS BAR ELECTRICAL DISTRIBUTION SYSTEMS.

A purpose of this invention is to provide a bus bar electrical distribution system which can be entirely assembled at the site of the system out of previously manufactured components which have been manufactured without that particular system which is being assembled being in mind at the time of manufacture of the components.

A further purpose of this invention is to provide such a system which can be especially compact and yet at the same time entirely effective, this compactness exhibiting itself especially at the joints.

A further purpose is to have such a system in which the system shall be especially readily assembled to form a thoroughly effective and desirable whole.

Going more specifically to a major aspect of this, as a historical matter in actual practice as I know it, busway feeder products that transmit electrical power in buildings are exclusively of factory fabricated and assembled circuit components of bus bars in metal raceways varying in number of conductors, lengths, and forms, customized for job site assembly to conform with dimensions of the building construction.

On the other hand, electrical feeders employing wire conductors are exclusively of job site fabrication and assembly of varying types, shapes, and forms of raceways fitted into a building into which insulated wire conductors are installed as circuits.

The economics of total installed cost of high capacity electrical distribution systems in buildings, historically, has favored the use of busway feeders in "tree" system arrangements in circuit ampacities above 800, whereas wire feeders are preferred as circuits in "radial" system arrangments in circuit ampacities 600 and less.

Under this prior art setup, to select and install electrical feeders in a building, whether of factory or field assembled conductors, is complex and costly, because of system orientation of feeder products and the infinite variety of building construction that requires customized fabrication of materials and installation procedures of the feeder circuits.

My invention represents a new concept of busway system planning, product design, product selection, and product installation. Systems may be planned as single low ampacity (300 to 600 A.) circuits for radial system arrangement, or in matched impedance parallel high capacity (800 to 4000 A.) circuits for tree system arrangement.

The busway product scope consists of a minimum number of standardized, physically and electrically co-ordinated, fixed and variable, lengths of circuit functional components that transmit power, terminate, turn, and tap feeder circuits in a wide range of electrical distribution systems and circuit ampacities, interchangeable in a single size enclosure for all circuit functional components.

Fixed modular length functional run components in combination with "one-bolt" variable length straight sections allow job site selection and installation of an infinite variety of assembled component lengths to fit into construction of buildings.

SHORT DESCRIPTION OF THE DRAWINGS

Describing in illustration and not limitation a particular exemplary embodiment of my invention, the drawings are as follows:

FIG. 7 shows the internesting covers of the form of joint box of FIG. 3, in a longitudinal section through the center, and FIG. 8 the same in a cross-section at a point away from the center, while FIG. 9 shows a detail of the outside of the setup.

DETAILED DESCRIPTION

In an overall example of the preferred embodiment of the electrical distribution system of my invention, I will use lines of conduit and bus bar such as found in my above-mentioned parent application Ser. No. 755,446, now U.S. Pat. No. 4,112,249 which has been incorporated herein by reference, together with special joint setups which will be described in the present application.

Figure 1:
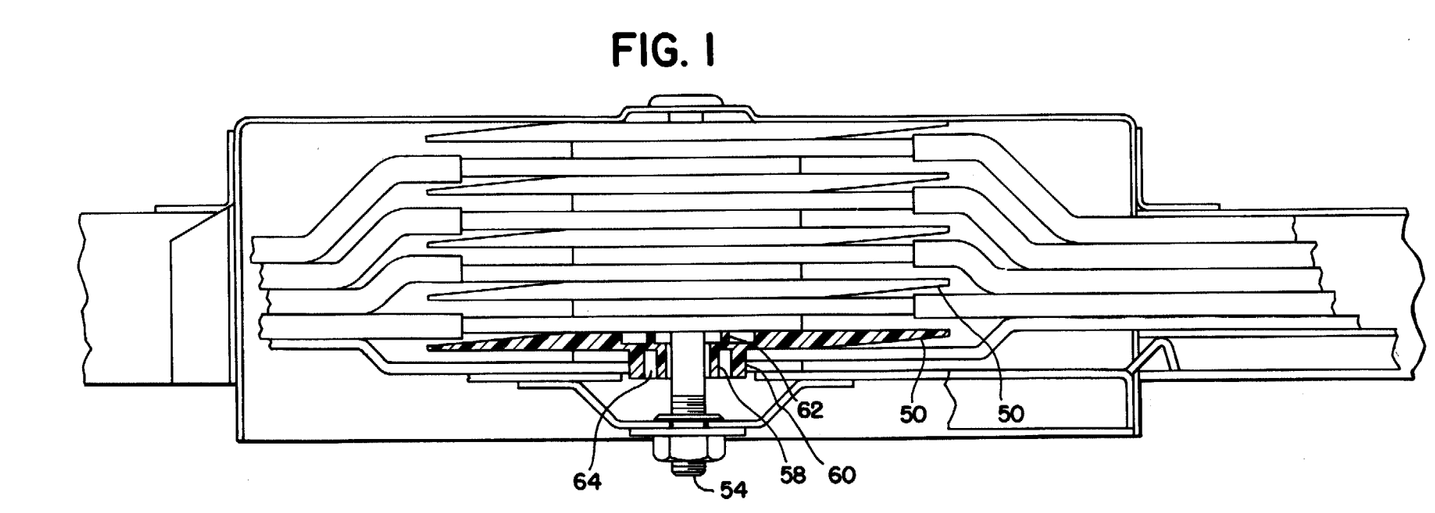
FIG. 1 is a longitudinal section through a particular embodiment of a joint setup of my invention, shown inverted with the U-shaped tray member upside down and the cover member on the bottom, the showing of the insulating spacer disks mostly omitting the protruding circular walls and associated structure.
Figure 1A:
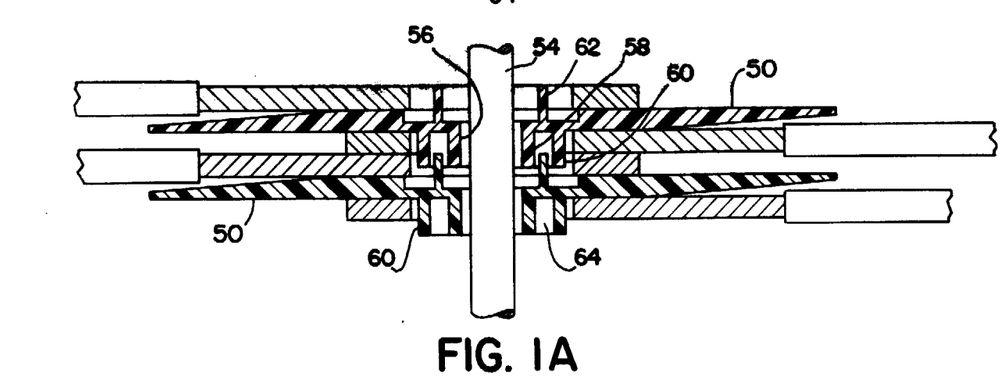
FIG. 1A is a longitudinal section showing part of the above subject matter and thus illustrative of the particular features of the above, and specifically showing the protruding circular walls and associated structure of the insulating spacer disks.
Figure 1B:
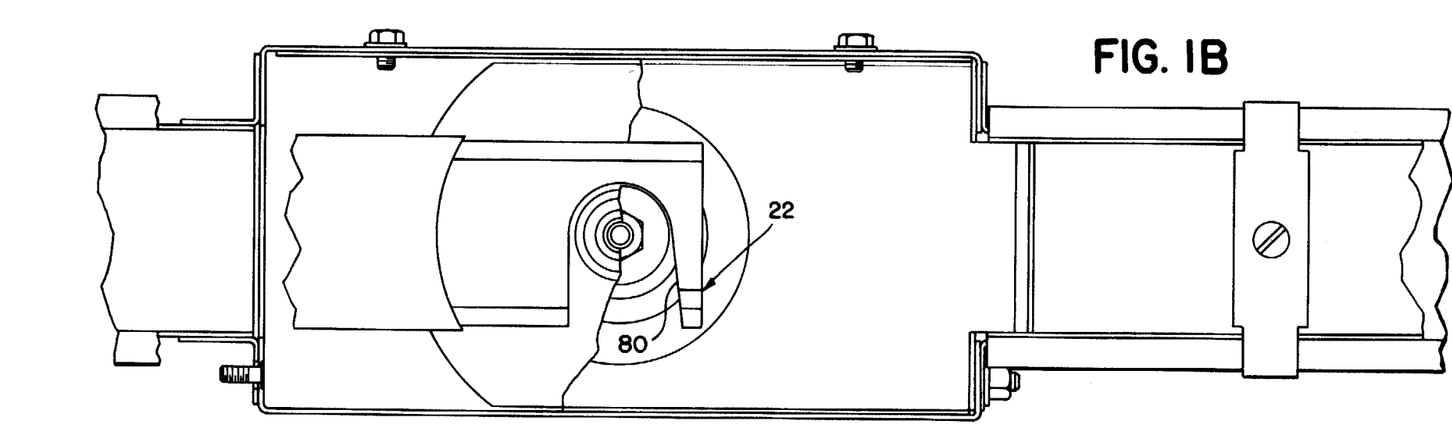
FIG. 1B is a view in elevation, partly broken away, taken from outside looking toward the cover of the above joint setup, but for illustrative purposes to show the hook form from the top it brings out in front of the cover the hook which is actually behind the cover, the form illustrated being a somewhat variant one in that the bus bar is tapered along the edges and double tapered at the hook.
Figure 1C:
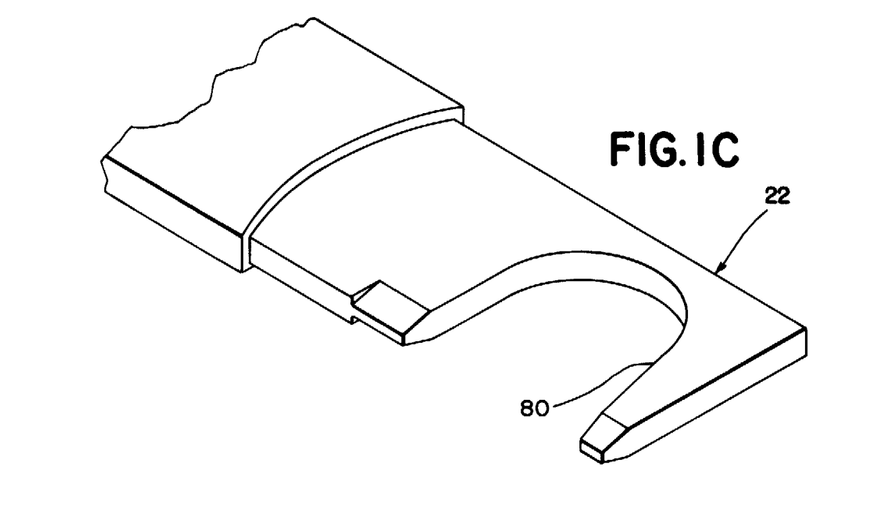
FIG. 1C is a view of a particular embodiment of the hook form of the bus bar, taken in perspective.
Figure 1D:
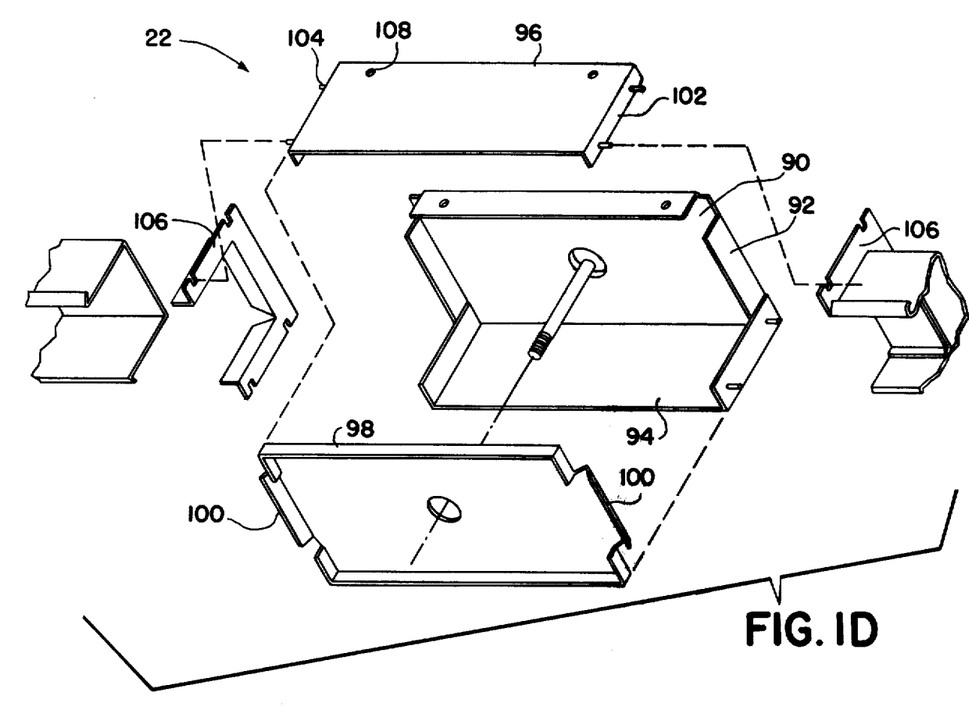
FIG. 1D shows an exploded view in perspective of the joint setup of the preceding figures, but leaving out the bus bars and insulating spacers, and showing the studs diagrammatically.
Figure 3:
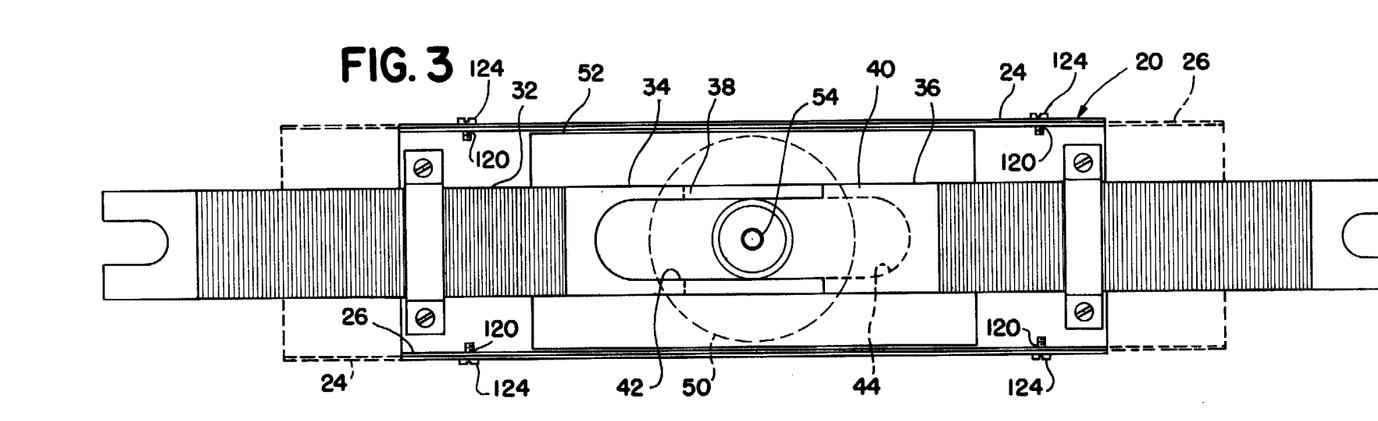
FIG. 3 is a downwardly directed horizontal sectional view of a joint setup of my invention, being a form of joint setup different from those of the earlier mentioned Figures, but which may and preferably will be used in the very same system as those of the earlier mentioned Figures, such an electrical distribution system being as a practical matter likely to have both the form of joint setup of FIG. 3 and one of the earlier-shown forms as particular features at different ones of its joints.

In a typical such installation, as especially preferred there will usually be more than one type of joint setup, and more specifically there will typically be the type of joint setup found for example in FIG. 3, which will be denominated the overlapping tray or conduit form 20 and also the type of joint setup found for example in FIGS. 1C and 1D, which will be denominated hook bar form 22.

Turning first to the joint setup of FIG. 3, which as indicated will be denominated the overlapping conduit or tray form 20, this includes outer and inner overlapping U cross-sectioned tray members 24 and 26 respectively, with the inner one nesting in the outer and thus providing a capability of expansion and contraction by sliding them in one or the other direction relative to each other, the completely expanded position of the two elements being illustrated by the dotted lines in FIG. 3, while the contracted position of complete internesting is shown by the solid lines there.

The joint setup will likewise include longitudinally overlapping cover members 28 and 30 (FIGS. 7 and 8), with 28 on top of and inside 30, and again the showing having them in solid lines to show their position contracted relative to each other and in dotted lines for their longitudinally expanded positions, the cover members as indicated having a shallow U cross-section.

Inside the tray members are bus bars such as 32 in overlapping pairs such as 34 and 36, with the bared end 38 of bus bar 34 lying with its wide face against the wide face of bared end 40 of bus bar 36.

As will be seen in the central portion of FIG. 3, the respective ends 38 and 40 each have a slot, 42 and 44 respectively, coming in from its very end and making its end take the form of a deep U in each case.

The pairs of bus bar ends are located one above the other, in the sort of interrelation shown for example for another form of joint setup in FIG. 1.

Figure 10:
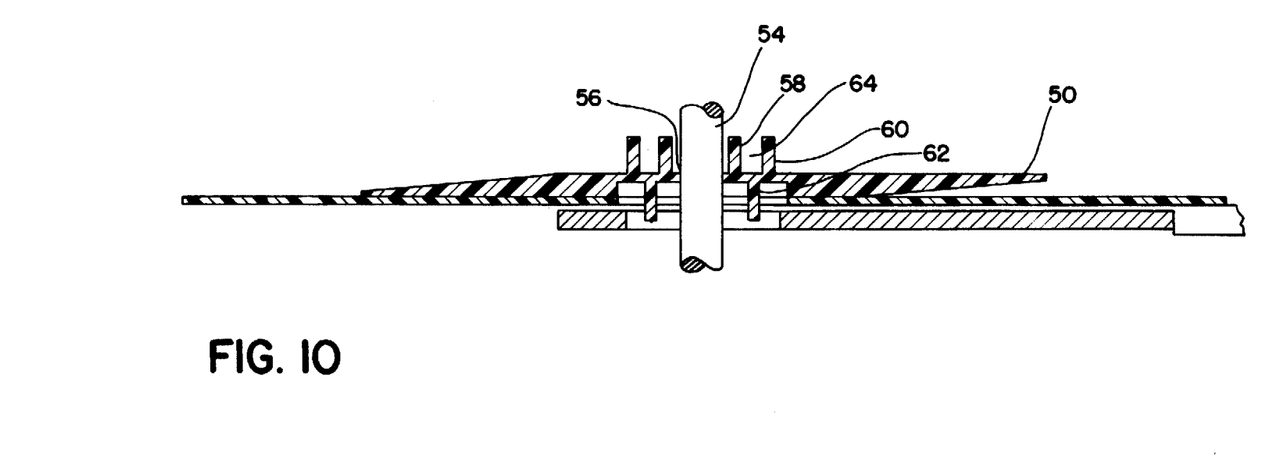
FIG. 10 is a detail of a longitudinal section of the form of FIG. 3, being the same general type of drawing as FIG. 1A for another form but showing additionally an illustrative example of insulating panels which lie toward the cover of the disk-shaped spacer in each case in the form of FIG. 3. In this FIG. 10, for clarity of illustration, the bared part of the bus bar on the bottom is shown slightly spaced from the insulating panel above it throughout the length of that bared part of the bus bar, even though as a practical matter once the joint is put together and duly tightened up, the panel and the bared part of the bus bar will at least mainly be tightened up against one another.

However, as shown in FIG. 10, between these pairs of bus bars are not only the disk members 50 as found in FIG. 1 and FIG. 1A in the other form, but also the elongated insulating panels 52 which are located toward the cover of each of these insulating disks and extend further longitudinally than they do.

As indicated in FIG. 3, these elongated insulating panels can preferably be in rectangular form and can be quite thin as for example, 1/16" in the case of a 600 ampere bus bar joint. The disks 50 can be the same insulating disks as found in FIG. 1 which will be noted from FIG. 1 to preferably have a special shape by which they taper at each end away from the nearby bus bar of the pair, so that for example when in FIG. 1 the bus bar nearer the cover of the pair has a particular insulating spacer close to it, the side of that insulating spacer being on the other side nearer to one of a pair on that other side will on that other side taper away from that one of the pair, and vice versa for the disk's other end.

These disk-shaped spacers 50 with the circular outline have a hole in the middle large enough to receive a bolt 54 which will extend entirely through the interior of the form of FIG. 3, just as it does in the form at FIG. 1, with all the holes in the center of the spacers being in registry. Beyond this center hole 56 in the spacers, the spacers have two spaced walls 58 and 60 each circular and extending in parallel fashion, 58 inside of 60, in the one direction from the spacer and circular wall 62 extending in the opposite direction from the spacer, circular wall 62 being adapted to fit into the space 64 between the double circular walls 58 and 60 of the next spacer. The longitudinal elongated insulating panel of FIG. 10 has a hole in its center large enough to accommodate not only the bolt but also these center walls of the disk-shaped spacers which surround this bolt and the hole for that bolt.

Figures 7, 8, 9:
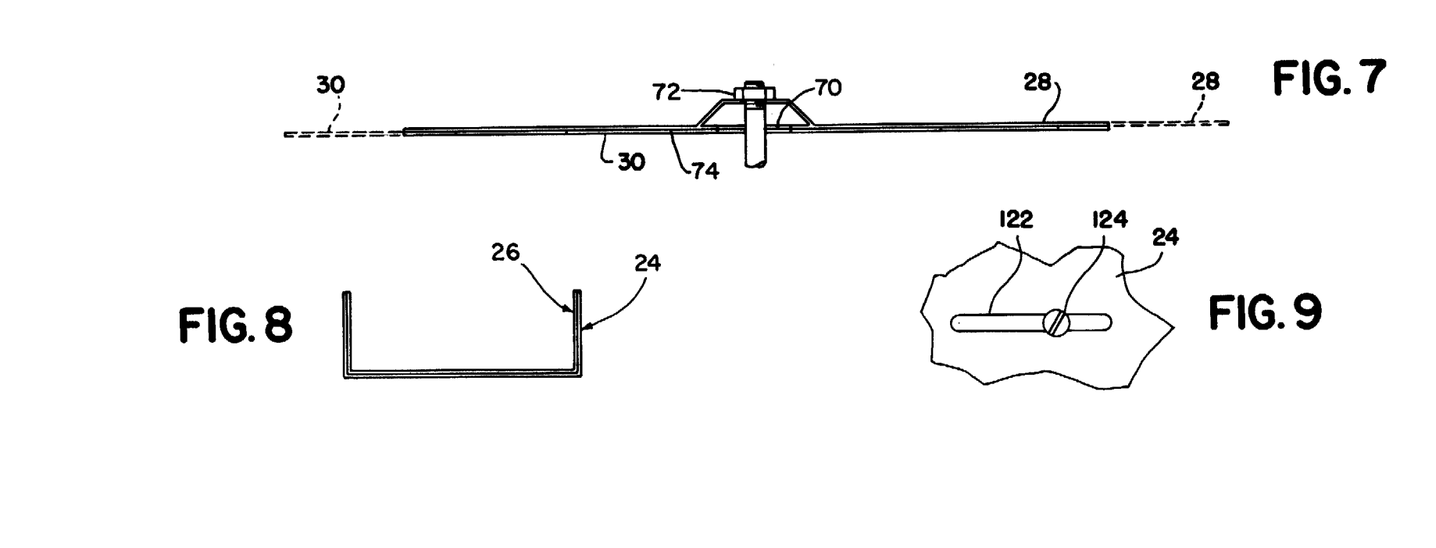

The outermost one of the two overlapping cover members 28 and 30, in the sense of being the furthest away from the interior, or in other words cover member 28, has preferably not only hole 70 to permit passage of the bolt through it, but also outside of that hole captive nut 72 with which the bolt will cooperate by its thread. Cover member 30 which is closer to the interior of the joint will have an elongated longitudinal slot 74 sufficient to accommodate the bolt and so positioned that the bolt can go through this particular cover member both when the two cover members are internesting in completely contracted position and also when they are out in their furthest extended longitudinal expanded position.

The joint setup of FIGS. 1 through 1D has similar disks similarly positioned but without any insulating panels on either side or elsewhere, all insulation being done by the disks as between different phases of the bus bar pairs and also between any such bus bar pairs and ground. For example, the figure as shown in FIG. 1 involves four different pairs of bus bars capable of carrying current and one capable of serving as a ground and disks in between each of the four bus capable of carrying current and also one outside the furthermost of these away from the cover and one outside the furthermost of these toward the cover and as it happens between these and the one capable of serving as a ground. Similar arrangements of insulating spacer disk and in that case elongated panels as well can be had for example in the form of FIG. 3.

As will be seen especially in FIG. 1C, instead of longitudinally positioned U-shaped fingers by the bus bars at the joint as in the case of the form of FIG. 3, the form of FIG. 1 through FIG. 1D will preferably have only one at most of that type of bus bar end in each pair and the other end in the pair will preferably be in a hook shape bringing its furthest end around the opening for the bolt in a direction across the longitudinal direction of the bus bar as at 80.

This form of joint setup will preferably have enclosing box members such as found in FIG. 1D in the form of a single angular type of box component 90 which will include both enclosing plate 92 at the head of the bolt and a plate 94 at one side of the bolt, and then there will be a separate side plate 96 and a separate cover plate 98, which has angular tangs 100 adapted to cooperate with neighboring conduits, these various plates being adapted to be joined up to each other and their conduit with the aid of respective flanges as shown in the drawing which flanges can collectively be nominated 102.

Thus, for example, studs 104 in the flanges of side plate 96, two of them in each end flange, and also in the corresponding end flanges of angle plate 94, two of them in each end flange, can pass through corresponding slots in the end flanges of the sides of the U cross-sectioned conduits and the respective flanges 106 be held together by nuts on the end of the studs in the usual fashion.

Also, at holes 108 in the side plate and the longitudinal flange of the angle plate, the respective plates can be held together by self-tapping screws (not shown).

While the form of FIGS. 1 through 1D has a single ultimately intended shape and size, the form of FIGS. 3 and 7 through 10 is longitudinally extensible and contractible, depending upon the particular requirements imposed by the place where it is intended to be installed.

To accommodate to this situation, the inner U cross-sectioned tray member 26 has threaded holes 120 at two positions in each side, outer U cross-sectioned tray member 24 has slots 122 (see FIG. 9) enabling it to move back and forth through its entire longitudinal range without covering up holes 120, and screws 124 can thus be inserted into holes 120 and tightened up to hold the two tray members in any relative position desired.

The dimensions of the insulating disk spacers and any cooperating components should be selected so as to give adequate spacing dimensions between different phase bus bars and between bus bars and ground, both when measured by minimum total air distance path through the various interconnecting air space and by minimum total surface distance path along intervening insulating surfaces. These distances are in accordance with norms already established and will for example in the case of 600 ampere multiphase distribution be a minimum of one inch through the air phase to phase and a minimum of two inches over the surface phase to phase, and a minimum of one-half as much in each case from phase to ground.

For example, in the form of FIGS. 1 through 1D there would be a total of at least one inch from the point up to which one bus bar is bared, radially out across the end of the bus bar insulation, then back through the air to the beginning of the outer edge of the disk, across the outer edge of the disk, through the air to the end of the other phase's insulation and then radially inward across that end of the insulation to the point up to which the other phase bus bar is bared. The two inch minimum surface path between phases would go along the disk surface between nearest points of contact between the disk and adjacent different phase bus bars, for example.

As another example, the minimum air distance between one of the phases and ground in the form of the central bolt would go from a point on the inside of the U slot of the bus bar of that phase through the air, then radially across the end edge of outer circular wall 60 of one disk to the inside of that end edge and through the air to the outside of the end edge of circular wall 62 of the interfitting next disk. Then it would go radially inwardly across that end edge, then through the air to the outside edge of inner circular wall 58 and radially inwardly across that edge and through the air to the outside of the bolt.

Figure 4:
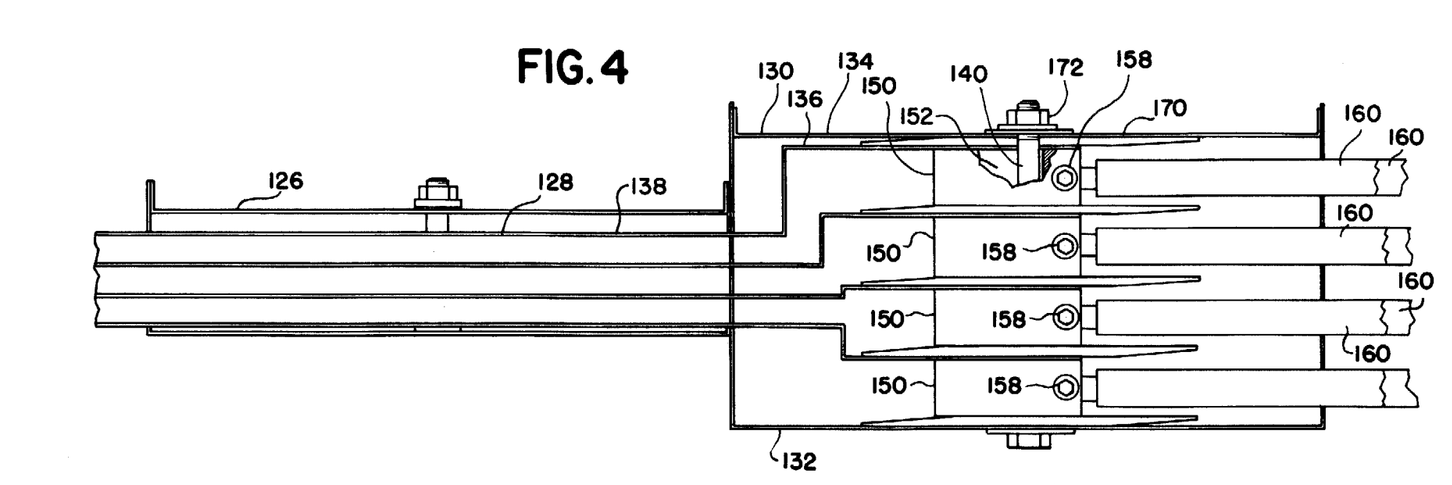
FIG. 4 is a section partly also in elevation of a joint between bus bars and wires of my invention, leaving out the main bus bars and merely showing the branch interconnections, the section being longitudinal of the interconnections.
Figure 5:
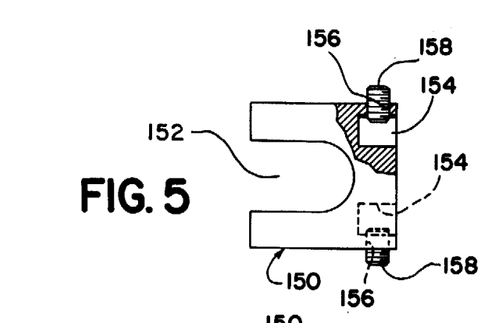
FIG. 5 is a top elevational view of the interconnections used in the form of FIG. 4 at their ends which connect with the wires.
Figure 6:
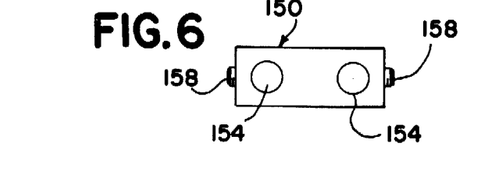
FIG. 6 is a view of the same thing as FIG. 5 but an elevational view from the very end of these ends.

FIGS. 4 through 6 show a special joint setup intended to facilitate tapping the bus bar circuitry for wire branches. Next to joint setup 126, which may be any suitable joint setup with an open side and a certain amount of extra room to enable insertion of tapping bus bar extension ends 128, is joint setup 130, including deep U cross-sectioned tray 132 and shallow U cross-sectioned cover 134 into which come the other ends 136 of the bus bar extensions 138, which have fingers going on both sides of insulated bolt 140.

Held against the underside of these fingers are aluminum or other conductive blocks 150, shown especially in FIGS. 5 and 6, which can be inserted so as to bring U-shaped slot 152 around the bolt. At the opposite end from that slot they have longitudinally directed holes 154, into the sides of which extend screw-threaded holes 156, enabling insertion for example of Allen-head screws 158. Thus the wires 160 can be inserted into the holes 154 and tightly held there in good conducting relationship by the screws. Insulating panels 170 between and on the outside of the various electrically separate components preserve that separation within the joint setup.

Inserting the insulated bolt through into captive nut 172 holds everything together in tight interrelation just as in the other joint setups.

In addition to the form that has only the one hook type bus bar end and one ordinary U type bus bar end joined together, there can be a variation in which both the bus bar ends joined together are of the hook type.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Figure 2:
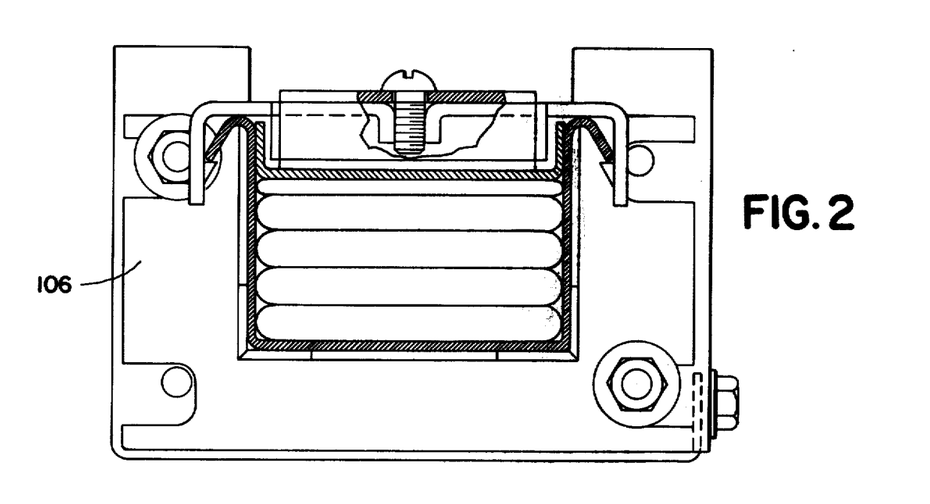
FIG. 2 is a cross-sectional view thru the bus bar conduit looking toward the same form of joint setup of my invention, with two of the nuts removed, the conduit with its associated elements being in a form preferred to that in my parent application Ser. No. 755,446, now U.S. Pat. No. 4,112,249, incorporated by reference, the bridge and tray having a different latching engagement.

The conduit and related elements shown in FIG. 2 include a bridge whose cross-section is in channel form in the part between the sides of the tray and whose ends extend downwardly in flanges along the far edges of the angular overhang of the tray channel. In the center of the flanges are protrusions extending inwardly to engage that angular overhang from below when pressed into the position shown. In this latched situation the tightening of the bolt in the center of the bridge presses the channel against the cover and the enclosed conductors. It is apparent that the bridge setup can be positioned as desired along the length of the conduit.

In the form of FIG. 1 the distance from the top of the enclosure, considered from the standpoint of the cover being on the bottom, is greater on the right of the figure than on the left of the figure, and the distance from the bottom of the conduit to the bottom of that same enclosure member is less on the right than on the left. This so aligns the conductors that they may be assembled in overlapping engagement without distortion.

One advantage of the present form of setup is that the insulating disk spacers can all be identical in size and shape thruout the system for a great variety of setups and ampacities, thus greatly facilitating interchangeability of circuits and systems and ampacities in a single size enclosure, and greatly helping the attainment of the goal of being able to install the system on a particular site without previous consideration of the particular characteristics of the site or the manufacture of customized components.

The showing in FIG. 3 of the far ends of the bus bar away from the joint as simply longitudinally directed Us in shape is a less preferred form in a situation where it would be much preferred to have the far ends in hook form as found in the type of form of joint of FIGS. 1 thru 1D, for example. This latter enables a preferred form of very simple and effective assembly of the far ends in their own joints, by simply bringing them around the insulating protrusions 60 of the disk.

In the form of FIG. 3, the longitudinally extended insulating panel 52 is overlaid upon the adjacent disk in a position and of a length to extend the separating insulation in the position where the bus bars are extended in their interrelation.

The end of the bus bar in the hook form will have an opening to form the hook which is beyond and around the circular wall or protrusion 60. This is likewise true of the end slot in the form of FIG. 3, and in the form of FIG. 4, in the sense that both sides and the base of the U are beyond the circular wall or protrusion from the center of the bolt line, thus the circular wall or protrusion 60 will go thru the slot in the U or hook in the bus bar.

In the present joint setup as found in the forms of the type of FIGS. 1 thru 1D, when the bus bars are brought together into final contacting position, the hook end will preferably be brought into the position of final face to face contact by moving it in in the plane of the overlapping faces while the side member's opening is still open, and afterwards the side member will be put in place.

Having thus described my invention, what I claim as new and desire to secure by Letters Patent is:

1. An electrical distribution setup in which there is a joint for successive conduits and bus bars in which two U cross-sectioned trays lie one inside of and overlapping the other, a plurality of flat bus bars lie one above another in the trays with their wide sides parallel to the bottoms of the trays, two U cross-sectioned covers lie one inside of and overlapping the other above the bus bars, the bus bars are arranged in pairs one of which extends from beyond one end of tray and cover in to lie against in overlap contact with the other one of the pair, which other one extends in from beyond the other end of tray and cover, with the respective overlapping ends of the bus bars being in the form of longitudinally directed U's having the open end of the U directed beyond the end of the bus bar, there being insulating spacers between the pairs of bus bars and outside of the outermost such pairs, each of which spacers is of insulating material in the shape of a disk with an opening in its center and a circular wall protruding in one direction around the axis of the opening and a pair of circular walls protruding in the opposite direction around the axis of the opening, the single circular wall of one such disk being adapted to fit in between the pair of circular walls of the neighboring such disk, and there being longitudinally elongated plates of insulated material positioned similarly to the disks in places next to the various disks and having holes through them registering with the holes in the disks, a hole in the cover which is outer relative to the bus bars which hole is likewise in registry with those holes, and a nut captive to that cover located in registry with those holes, a corresponding hole in the outer longitudinal slots in the cover and tray which are inner relative to the bus bars which slots include at least longitudinally elongated portions likewise in registry with those holes, and a single bolt extending through all the previously mentioned holes, slots, captive nuts and open-ended U's forming bus bar ends, to hold all together in fixed relation in a single joint.

2. A joint setup in a bus bar system which comprises one set of bus bars having bared ends side by side, another set of bus bars having bared ends side by side adapted to interfit with the first set with corresponding bus bars having flat faces against flat faces of the first set, and a plurality of at least mainly flat insulating members independent of the bus bars adapted to fit between and on the outside of the respective bus bars to insulate them from one another insofar as not joined together and from the outside, the bus bars and the insulating members all having corresponding spaces in the area of the jointure through which a single bolt can pass to join all together, and the respective insulating members nearest to one another having concentric protrusions around these spaces, one protrusion being in the form of a double wall with a recess in between and the corresponding protrusion of the other insulating member being in the form of a single wall adapted to interfit into this recess, the whole being enclosed in a suitable joint box.

* * * * *